United States Patent
Gross et al.

(10) Patent No.: US 9,849,636 B2
(45) Date of Patent: Dec. 26, 2017

(54) REINFORCED STRUCTURAL ELEMENT MADE OF PLASTIC, IN PARTICULAR IN THE VEHICLE INTERIOR DESIGN FIELD

(75) Inventors: Bernd Gross, Langenfeld (DE);
Hans-Georg Werner, Langenfeld (DE);
Sreenivas Paruchuri, Eastbourne (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 1029 days.

(21) Appl. No.: 14/111,734

(22) PCT Filed: Mar. 12, 2012

(86) PCT No.: PCT/EP2012/001096
§ 371 (c)(1),
(2), (4) Date: Mar. 4, 2014

(87) PCT Pub. No.: WO2012/139689
PCT Pub. Date: Oct. 18, 2012

(65) Prior Publication Data
US 2014/0178652 A1    Jun. 26, 2014

(30) Foreign Application Priority Data

Apr. 15, 2011 (DE) .......... 10 2011 017 281

(51) Int. Cl.
*B32B 3/00* (2006.01)
*B29C 70/42* (2006.01)
(Continued)

(52) U.S. Cl.
CPC .............. *B29C 70/42* (2013.01); *B29C 70/46* (2013.01); *B29D 99/001* (2013.01); *B60N 2/686* (2013.01);
(Continued)

(58) Field of Classification Search
CPC ....... B29C 70/42; B29C 70/46; B29D 99/001; B60N 2/62; B60N 2/686; B60N 2/7011;
(Continued)

(56) References Cited

U.S. PATENT DOCUMENTS 6,056,366 A * 5/2000 Haynes ................. B60N 2/688
297/216.1
6,423,388 B1 * 7/2002 Bateson ............... B29C 70/222
297/452.2
(Continued)

FOREIGN PATENT DOCUMENTS

DE       195 48 854 A1    7/1997
DE    10 2009 006130 A1    7/2010
(Continued)

OTHER PUBLICATIONS

Office Action dated Dec. 26, 2014, in corresponding Korean Application No. 10-2013-7030247 and English translation, 6 pages.
(Continued)

*Primary Examiner* — Maria Veronica Ewald
*Assistant Examiner* — Travis Figg
(74) *Attorney, Agent, or Firm* — Foley & Lardner LLP

(57) ABSTRACT

A vehicle structural element made of plastic has at least one carbon filler reinforced region and at least one fiberglass reinforced region. In a method for producing the vehicle structural element, a pre-heated carbon fiber reinforced region and a pre-heated fiberglass reinforced region are placed in a press and shaped.

6 Claims, 1 Drawing Sheet

Figure 1:
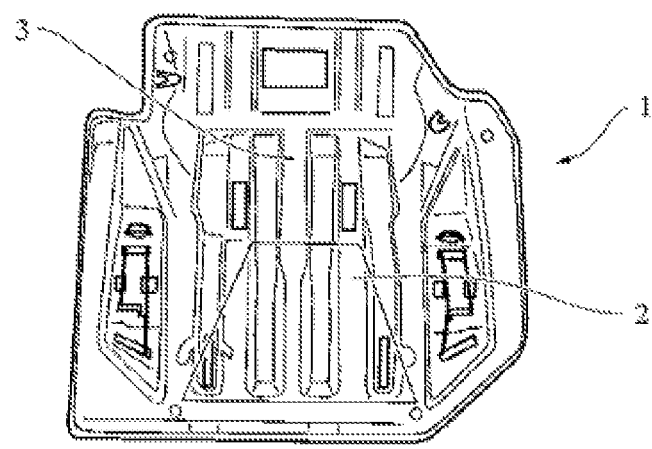

(51) Int. Cl.
   *B29C 70/46* (2006.01)
   *B60N 2/68* (2006.01)
   *B29D 99/00* (2010.01)
   *B60N 2/70* (2006.01)
   *B29L 31/30* (2006.01)

(52) U.S. Cl.
   CPC ......... *B60N 2/7011* (2013.01); *B29L 2031/30* (2013.01); *Y10T 428/2481* (2015.01); *Y10T 428/24752* (2015.01); *Y10T 428/24802* (2015.01); *Y10T 428/24818* (2015.01)

(58) Field of Classification Search
   CPC ......... B29L 2031/30; Y10T 428/24752; Y10T 428/24802; Y10T 428/2481; Y10T 428/24818
   See application file for complete search history.

(56) References Cited

U.S. PATENT DOCUMENTS

| | | | |
|---|---|---|---|
| 7,250,091 B2 | 7/2007 | Gupta et al. | |
| 2006/0273644 A1* | 12/2006 | Sturt | B60N 2/3013 297/284.9 |
| 2010/0117430 A1* | 5/2010 | Moeseneder | B60N 2/5816 297/391 |
| 2010/0155536 A1* | 6/2010 | Asami | A47C 7/40 244/122 R |
| 2010/0181811 A1* | 7/2010 | Bonne | B60N 2/24 297/216.13 |

FOREIGN PATENT DOCUMENTS

| | | |
|---|---|---|
| DE | 20 2009 006966 U1 | 9/2010 |
| EP | 0 782 909 A2 | 7/1997 |
| KR | 10-2005-0093864 A | 9/2004 |

OTHER PUBLICATIONS

International Preliminary Report on Patentability in PCT/EP2012/001096 dated Oct. 15, 2013.
*Tailgate Uses E-LFT Technology*, Reinforced Plastics, 20080401 Elsevier Advanced Technology, New York, NY, US—ISSN 0034-3617, vol. 52, Nr.4, http://dx.doi.org/10.1016/S0034-3617(08)70072-9.
International Search Report dated Jul. 18, 2012 as receiving in corresponding International Application No. PCT/EP2012/001096.
Examination Report dated Mar. 5, 2015 received in corresponding European application No. 12714561.3,6 pages.
Schut, Jan H. "Long-Glass Leader-How Faurecia Helped Put TP Composites in the Driver's Seat" Plastics Technology Issue Aug. 2002, 5 pages, published by Gardner Business Media, Inc., 2015 Cincinnati, Ohio 45244.

* cited by examiner

REINFORCED STRUCTURAL ELEMENT MADE OF PLASTIC, IN PARTICULAR IN THE VEHICLE INTERIOR DESIGN FIELD

CROSS REFERENCE TO RELATED APPLICATIONS

The present application is a U.S. National Stage of International Application No. PCT/EP2012/001096, flied on Mar. 12, 2012, which claims the benefit of German Patent Application No. 10 2011 017 281.5, filed on Apr. 15, 2011, the entire disclosures of all of which are incorporated herein by reference.

The present invention relates to a vehicle structural element made of plastic. The present invention further relates to a method for producing a vehicle structural element made of plastic.

In vehicle construction, there are continuous efforts to reduce the weight of the vehicles. In this respect, metal structural parts in particular are to be replaced by fiber-reinforced vehicle structural elements made of plastic. Methods for producing fiber-reinforced vehicle structural elements made of plastic or plastic structural elements of this type are known, for example, from DE 195 48 854 C2, EP 0 782 909 B1 and also EP 0 782 909 B1. The fiber-reinforced vehicle structural elements made of plastic which are described therein are, however, relatively expensive to produce.

It was therefore an object of the present invention to provide a fiber-reinforced vehicle structural element made of plastic which can replace a metallic structural element and which is easy and inexpensive to produce.

The object is achieved by a vehicle structural element made of plastic having at least one carbon-fiber-reinforced region and at least one glass-fiber-reinforced region.

The present invention relates to a reinforced vehicle structural element made of plastic. This is in particular a vehicle structural element made of plastic which is provided in the vehicle interior design field. The vehicle structural element is preferably a component which replaces a component that has been produced to date from metal. A vehicle structural element within the context of the invention is any component which has not only a decorative function but also a bearing function in the vehicle. By way of example, the vehicle structural element which is reinforced according to the invention and is made of plastic is a structural component of the backrest or of the seat part of a front and/or back seat and/or a structural component of the dashboard and/or a structural component of the vehicle door and/or a structural component of the vehicle door panel and/or a cross-member and/or a vehicle body part. In particular, the vehicle structural element made of plastic according to the invention is part of the frame of a vehicle seat. Furthermore, the reinforced vehicle structural element made of plastic can be a seat substructure. However, any other structural element of a vehicle can also be provided as the vehicle structural element according to the invention.

According to the invention, the vehicle structural element made of plastic is reinforced, it having at least one region which is reinforced with carbon fibers and at least one region which is reinforced with glass fibers. The carbon fibers and the glass fibers can have any desired length or any desired thickness. The carbon fibers and the glass fibers can be directed or undirected. The carbon fibers and/or the glass fibers can be present as a woven fabric, mat, laid screen, knitted or crocheted fabric and/or a combination of these structures. This semifinished product is preferably shaped into a three-dimensional structure (3D structure), for example by thermal deformation. It is preferable that the carbon-fiber-reinforced region is arranged in a region of the vehicle structural element which is subjected to higher mechanical loading than the region of the vehicle structural element made of plastic in which the glass fibers are arranged. The carbon-fiber-reinforced region and the glass-fiber-reinforced region preferably butt directly against one another or are even provided in an at least partially overlapping manner. It is preferable that merely the regions subjected to high loading are reinforced with carbon fibers. The entire remaining region of the vehicle structural element made of plastic according to the invention is preferably reinforced with glass fibers, so that the vehicle structural element made of plastic is preferably provided with complete reinforcement.

However, it is also possible to provide segments of the vehicle structural element which are reinforced with glass fibers and reinforced with carbon fibers.

The materials are placed in the corresponding structural element to meet the requirements, taking into consideration the desired strength. This segmentation makes it possible to considerably reduce the component weight without having to accept losses in terms of mechanical stability. Furthermore, the division into different regions makes it possible to provide a component which is optimized in terms of cost and is considerably less expensive than a component produced, for example, completely from carbon-fiber-reinforced plastic.

The vehicle structural element made of plastic according to the invention preferably has a three-dimensional structure. It is furthermore preferable that the vehicle structural element made of plastic has a profile and/or a concavity or a convexity, in particular in order to further increase the stability thereof. In the vehicle structural element made of plastic according to the invention, provision can be made of a means, for example a recess, for fastening a component to the vehicle structural element.

The vehicle structural element made of plastic according to the invention can be produced, for example, by what is known as the D-L-F-T (direct long reinforced thermoplastic) pressing method. In this method, a preferably heated specific volume of various components is placed into a mold, for example by a robot. In this respect, the desired reinforcement in the respective region is taken into consideration. Then, the mass is changed into the desired shape, for example using a press. Polypropylene (PP) or PP copolymer is suitable in particular as the plastic which is reinforced by the carbon fibers and/or the glass fibers.

Hereinbelow, the invention will be explained with reference to FIGS. 1 and 2. These explanations do not have a limiting effect on the general concept of the invention. The explanations apply equally to all subjects of the present invention.

Figure 2:
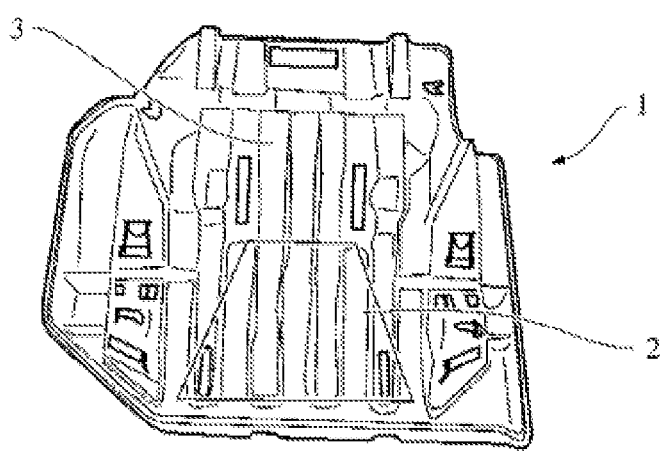

FIG. 1 shows the front side of a vehicle structural element made of plastic according to the invention, FIG. 2 shows the rear side of a vehicle structural element made of plastic according to the invention.

FIG. 1 shows the front side of a vehicle structural element made of plastic, here a seat cushion shell, which is reinforced according to the invention. The seat cushion on which the occupant sits is arranged on said front side of the shell. The seat shell is a vehicle structural element made of plastic which is reinforced according to the invention and has two regions 2, 3 each reinforced with a different material. The region 2 is a region which is reinforced with carbon fibers, whereas the region 3 is reinforced with glass fibers. The region 2, here the thigh rest of the seat cushion shell, has to be reinforced to a particular extent, because this is where increased loads occur, for example in the event of an accident, and this region has to have a particularly rigid configuration in order, for example, to prevent "submarining".

FIG. 2 shows the rear side of the structural element shown in FIG. 1. The two differently reinforced regions 2, 3 can again be seen, and therefore reference can be made to the statements relating to FIG. 1.

LIST OF REFERENCE SIGNS

1 Vehicle structural element made of plastic
2 Carbon-fiber-reinforced region
3 Glass-fiber-reinforced region

The invention claimed is:

1. A vehicle structural element made of plastic, comprising:
  at least one carbon-fiber-reinforced region; and
  at least one glass-fiber-reinforced region having no overlapping portion with the at least one carbon-fiber-reinforced region,
  wherein the carbon-fiber-reinforced region and the glass-fiber-reinforced region are provided edge to edge,
  wherein the vehicle structural element is a cushion shell of a seat part,
  wherein the at least one carbon-fiber-reinforced region extends in a thigh rest region of the seat part.

2. The vehicle structural element as claimed in claim 1, wherein the carbon fibers of the carbon-fiber-reinforced region and the glass fibers of the glass-fiber-reinforced region are directed or undirected, wherein the carbon-fiber-reinforced and the glass-fiber-reinforced regions are provided at least in part as semifinished products which are shaped in particular into a three-dimensional shape.

3. The vehicle structural element as claimed in claim 1, wherein the carbon fibers and/or the glass fibers are present as woven fabrics, mats, laid screens, knitted or crocheted fabrics and/or a combination of these structures.

4. The vehicle structural element as claimed in claim 1, wherein the carbon-fiber-reinforced region is arranged in a region of the vehicle structural element which is subjected to higher mechanical loading than the region of the vehicle structural element which is reinforced with glass fibers.

5. The vehicle structural element as claimed in claim 1, wherein the vehicle structural element is reinforced with glass fibers and/or carbon fibers on the whole.

6. A method for producing a vehicle structural element made of plastic as claimed in claim 1 based on a direct long fiber thermoplastic (DLFT) pressing method, the method comprising:
  reinforcing the plastic with carbon fibers and glass fibers to create a carbon-fiber-reinforced region and a glass-fiber-reinforced region;
  placing a mass of the plastic in a pre-heated state on separate portions corresponding to the carbon-fiber-reinforced region and the glass-fiber-reinforced region in a mold;
  changing the mass into a desired shape using a press; and
  removing the vehicle structural element in a finished state from the mold,
  wherein the vehicle structural element is a cushion shell of the seat part,
  wherein the carbon-fiber-reinforced region extends in a thigh rest region of the seat part.

* * * * *

UNITED STATES PATENT AND TRADEMARK OFFICE
CERTIFICATE OF CORRECTION

PATENT NO. : 9,849,636 B2
APPLICATION NO. : 14/111734
DATED : December 26, 2017
INVENTOR(S) : Bernd Groß, Hans-Georg Werner and Sreenivas Paruchuri Page 1 of 1

It is certified that error appears in the above-identified patent and that said Letters Patent is hereby corrected as shown below:

On the Title Page

Item (75) Inventors, the address of the third inventor should read as follows:
Eastbourne, GB

Signed and Sealed this
Twentieth Day of February, 2018

Andrei Iancu
*Director of the United States Patent and Trademark Office*